(No Model.)
P. GONDOLO.
PROCESS OF AND APPARATUS FOR THE MANUFACTURE OF TANNIN EXTRACT
No. 258,574. Patented May 30, 1882.
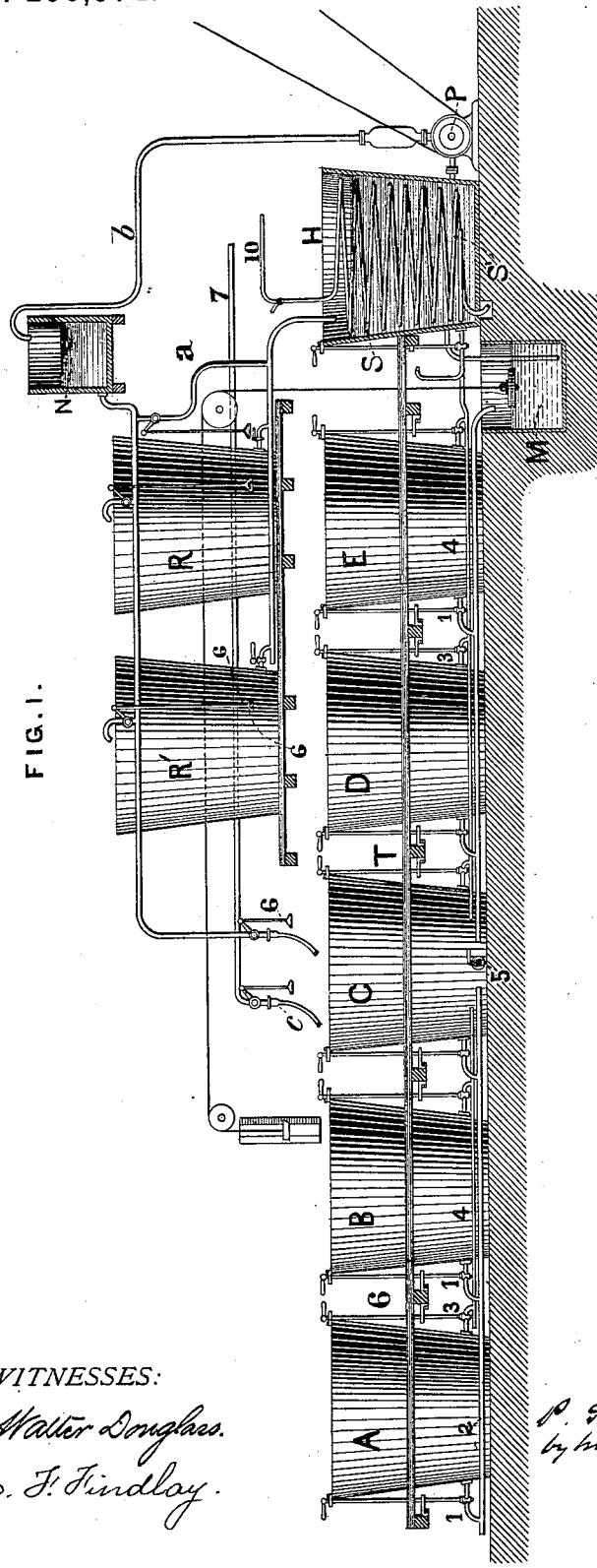
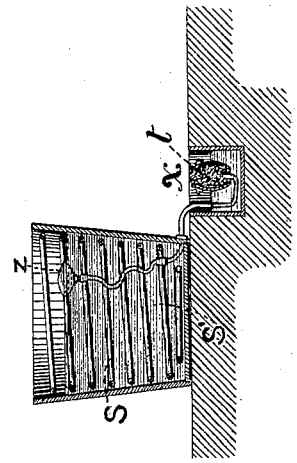
WITNESSES:
J. Walter Douglas.
Geo. F. Findlay.
INVENTOR
P. Gondolo
by his Atty
Henry Baldwin.

UNITED STATES PATENT OFFICE.

PAUL GONDOLO, OF PARIS, FRANCE, ASSIGNOR TO THE GONDOLO TANNIN COMPANY, OF HUNTINGDON, PENNSYLVANIA.

PROCESS OF AND APPARATUS FOR THE MANUFACTURE OF TANNIN EXTRACTS.

SPECIFICATION forming part of Letters Patent No. 258,574, dated May 30, 1882.

Application filed December 16, 1881. (No model.) Patented in Germany April 2, 1880, No. 7,864; in France April 10, 1880, No. 136,045; in Belgium April 14, 1880, No. 51,139; in England April 16, 1880, No. 1,568; in Italy April 19, 1880, No. 11,781; in Spain July 1, 1880, No. 765, and in Austria October 4, 1880, No. 24,013.

*To all whom it may concern:*

Be it known that I, PAUL GONDOLO, of Paris, in the Republic of France, have invented certain new and useful Improvements in Apparatus and Processes for the Manufacture of Tannin Extracts, of which improvements the following is a specification, reference being had to the accompanying drawings, forming part hereof.

My present invention is an improvement upon the process set forth in Letters Patent of the United States granted to me under date of August 10, 1880, No. 231,035, wherein was described a method of obtaining tannin extracts by macerating the vegetable substance containing the tannin in slightly-acidulated water, the subsequent neutralization of any excess of acid, and the clarification of the resultant liquor by the admixture and coagulation of blood in the manner therein described and by filtration. These improvements are in part described or contained in French Letters Patent No. 136,045, granted to me under date of April 10, 1880, for fifteen years, and are fully described or contained in British Letters Patent No. 1,568, dated April 16, 1880, obtained on my behalf for fourteen years. While the process set forth in said American patent is well adapted for use in connection with the vegetable matters from which tannin is ordinarily obtained, I have found that a more highly purified and more fluid extract can be obtained by my present invention, hereinafter described, which consists essentially in the following series of operations, viz: the use of a macerating-bath to which a salt containing sulphurous acid has been added—such, for instance, as the sulphite or bisulphite of soda—which, by decomposition in the presence of the tannin, yields a tannic salt—say tannate of soda—and some sulphurous acid. The latter acts as a reducing agent upon the coloring-matter of the vegetable substance under treatment, and by this reaction forms a certain quantity of sulphuric acid. This sulphuric acid in turn dislodges a certain portion of the tannic acid from its union with the soda and forms sulphate of soda, and also unites with any lime which may be present in the water. The undecomposed tannate of soda remaining in the solution is then reduced by the addition of free sulphuric acid in sufficient quantity to render the bath slightly acid and to eliminate the surplus sulphite or bisulphite from the solution. The extract thus obtained is notably of less color than that furnished by the process which forms the subject of my American patent hereinbefore referred to. If, however, it is intended for use in tanning uncolored leathers, clarification is desirable. This further operation is the more necessary when highly-colored barks or woods have been used in obtaining the extract.

The older processes of clarification present the twofold imperfections of incomplete decolorization and of loss by precipitating a notable quantity of tannin. The essential conditions of avoiding these objections are the intimate and thorough admixture of the clarifying substance, and its simultaneous operation upon every portion of the liquor. If an albuminous substance is used for clarifying, it is impossible to obtain these desiderata unless careful attention is paid to the conditions under which coagulation takes place, and in view of this fact I have devised the following method of controlling these conditions. Taking, for instance, blood as the type of coagulant to be employed, I proceed as follows:

The liquor resulting from the maceration processes hereinafter described is at a temperature so high that if the blood were mixed therewith immediate coagulation would take place. To avoid this I draw off the liquor into a tank the interior of which is traversed by a serpentine pipe. Cold water is run through this pipe until the temperature of the whole body of liquor is reduced to about 45° centigrade, which is below the point at which blood coagulates. I then introduce the blood, which permeates the body of liquor and is intimately mixed therewith by stirring. By passing steam through the serpentine pipe I raise the temperature to the coagulating-point of the blood, taking care, however, not to sensibly exceed that limit, and the liquid is then left undisturbed for a time, upon the expiration of which it will be found that the coagulated blood has descended to the bottom of the tank, carrying with it the coloring-matters and impurities, and leaving a supernatant liquor of remarkable limpidity. This liquor, after filtration and concentration, yields an extract of tannin of a very light yellow color, and so exceedingly fluid that thick hides can be tanned therewith in a few days.

In the accompanying drawings I have shown a system of apparatus adapted for carrying out my improved processes, and will now proceed to describe the details of the said apparatus.

Figure 1 of said drawings represents a vertical longitudinal section through the entire apparatus, showing the relative positions of the different portions of the system; and Fig. 2 is a vertical section through the clarifying-vat, showing certain details of the decanting and filtering apparatus.

A, B, C, D, and E are vats or tanks alike in size, of wood or other suitable material, and each provided with a discharge-cock, 1.

M is a reservoir into which the vats A B C D E are emptied through the pipe 2, which communicates with the pipes 1. Each of the vats is provided with a cock, 3, so as to be in communication with a steam-pipe, 4. It is provided also with a blow-off cock, 5. The cocks 1 and 3 are worked by means of a rod and handle, 6. A platform, T, is fixed on the side of the vats in order to facilitate access thereto during the operation. All the vats A B C D E may be emptied into the reservoir M through the pipe 2, and also may be heated by means of the steam-pipe 4. They are also in communication with a reservoir, N, through the pipes $a$ and $b$, which, in addition to movable delivery-pipes and nozzle $c$, allows of the introduction into any of the vats as desired of a quantity of the liquid contained in the said reservoir N. The purpose of the pipe 7, terminated by similar nozzle and movable pipe, is to admit water into the vats.

P is a pump for the purpose of drawing the liquids from the reservoir M and then forcing them into the reservoir N. These reservoirs communicate with a vat, H, of the same size as the vats A B C D E, but provided inside with a coiled pipe, S, and a steam-heater, S'. Cold water may be carried into the coiled pipe S through the pipe 10. The said vat H is provided further with a decanting device, Z, which floats upon the surface of the liquid and draws it off by a flexible pipe to a filter, $t$, placed below. (See Fig. 2.) The said filter $t$ may be of any kind; but it is preferable to use a small cask filled with shavings from which the tannin has already been extracted.

The operation is conducted as follows: The vat A is charged with the vegetable matter—say wood shavings—then filled with water, to which will be added 77.15 grains (five grams) of a sulphite or bisulphite (preferably bisulphite of soda) to each 2.20 pounds (one kilogram) of vegetable matter. Steam is then admitted through the cock 3, and the mass is boiled for about an hour. The cock 3 is then closed and the cock 1 opened in order to carry the liquid into the reservoir M. The pump P then forces the liquid into the reservoir N. From thence it is collected in the storage reservoirs or tanks R and R'. A second operation is then effected in the vat A with the same shavings by introducing water through the pipe 7, and, as in the first operation, the liquids resulting from the operation are carried either into the reservoir R or R', the next vat, B, having been meanwhile charged with shavings. Then the third operation is to be effected by pouring water into the vat A and forcing it by means of the pump P from the reservoirs M and N, through the pipes $a$ and $b$, into the vat B, from which latter the liquid is carried into the reservoirs R and R'. The fourth operation is identical with the third one, and in the fifth operation the only difference is that the liquid passes through the vat C before being carried to the reservoirs R and R', and the sixth operation is identical with the fifth, and so forth.

It will be noticed that the fresh vegetable matter is treated twice before the liquids are carried into the reservoirs R and R', and, indeed, the operation may be carried out a third time, instead of only twice, upon the vegetable matter, according to its richness. Each of the vats participates in twelve operations, and then is emptied and charged anew with fresh matter. There is then introduced into the reservoirs R and R', which contain the concentrated liquids, a sufficient quantity of sulphuric acid to reduce by oxidation or dissociation the tannate of soda, to eliminate the sulphite not decomposed, and to render the bath slightly acid. The sulphuric acid may be introduced into the clarifying-vat H; but it is to be noticed that the decoction must not test more than 2° Baumé for the complete success of the system of clarification. The decoction contained in the reservoirs R and R' is carried into the special vat H, where the clarification is to be operated. As, however, the temperature of the said decoction is at this stage of the operation generally rather high, it must be brought to a lower degree than that at which the albuminous or gelatinous matters coagulate before the albumen is introduced, it being the purpose of this part of the process to obtain a thorough diffusion of the albumen through the decoction before the clarifying action begins.

The necessary reduction of temperature is effected by passing cold water through the coiled pipe S in the vat H. When it is ascertained that the temperature of the liquids is below 40° the albuminous or gelatinous matters (blood by preference) are mixed by means of stirring, and the temperature of the mass is raised by means of the heater S' up to the point at which albumen or gelatine coagulates. The coloring-matters are thus precipitated with the coagulated blood at the bottom of the bath—a result which can only be obtained with certainty when the density of the bath does not exceed 2° Baumé, as the difference between the density of the precipitate and that of the liquor is very slight. As soon as the precipitation is effected the liquid is drawn off by means of the floating decanting device Z, and then filtered by passing it through the small cask t, Fig. 2, filled with shavings, as already mentioned, from whence it runs off into the cistern x, ready for immediate use in tanning. If intended for transportation, it will be found advantageous to evaporate the extracts down somewhat in order to obtain them in a more concentrated form.

Having thus described my invention, what I claim, and desire to secure by Letters Patent, is—

1. The hereinbefore-described improvement in the manufacture of tannin extracts, which consists in first macerating the substances containing the tannin in a bath containing a salt of sulphurous acid, and then treating the resulting solution by the addition of sulphuric acid, substantially as set forth.

2. The hereinbefore-described improvement in the manufacture of tannin extracts, which consists in first macerating the substances containing the tannin in a bath containing a salt of sulphurous acid, and then treating the resulting solution by the addition of sulphuric acid, and finally clarifying the liquor by the admixture and coagulation of blood or other coagulant, substantially as set forth.

3. The combination of the steeping-vats, the reservoirs N R R', and the clarifying-vat H, provided with the cooling coiled pipe and the heater S', substantially as and for the purposes described.

P. GONDOLO.

Witnesses:
EDW. D. THURSTON,
TIMOTHY J. SHEA.